United States Patent [19]

Law et al.

[11] Patent Number: 4,694,331

[45] Date of Patent: Sep. 15, 1987

[54] VERTICAL TRANSITION PROCESSOR FOR A COMB FILTER

[75] Inventors: Kirk A. Law, East Windsor; Leopold A. Harwood, Bridgewater, both of N.J.

[73] Assignee: RCA Corporation, Princeton, N.J.

[21] Appl. No.: 782,576

[22] Filed: Oct. 1, 1985

[51] Int. Cl.[4] .............................................. H04N 9/64
[52] U.S. Cl. ...................................... 358/31; 358/37; 358/36; 358/21 R
[58] Field of Search ............... 358/31, 36, 37, 21 R; 340/146.2; 375/76

[56] References Cited

U.S. PATENT DOCUMENTS

| | | | |
|---|---|---|---|
| 4,072,984 | 2/1978 | Kaiser | 358/31 |
| 4,141,037 | 2/1979 | Nishimura et al. | 358/37 |
| 4,178,609 | 12/1979 | Beutel | 358/31 |
| 4,179,705 | 12/1979 | Faroudja | 358/31 |
| 4,240,105 | 12/1980 | Faroudja | 358/31 |
| 4,241,363 | 12/1980 | Maeyama et al. | 358/36 |
| 4,307,413 | 12/1981 | Takeuchi et al. | 358/31 |
| 4,340,940 | 7/1982 | Williams, Jr. et al. | 364/745 |
| 4,389,665 | 6/1983 | Nagao et al. | 358/23 |
| 4,402,005 | 8/1983 | Lewis, Jr. | 358/28 |
| 4,570,177 | 2/1986 | Kondo et al. | 358/31 |

Primary Examiner—James J. Groody
Assistant Examiner—Robert M. Bauer
Attorney, Agent, or Firm—Paul J. Rasmussen; Eric P. Herrmann; David N. Caracappa

[57] ABSTRACT

A vertical transition processor for a comb filter detects the presence of a complementary-color vertical transition. A detector is provided for detecting if the color subcarrier on adjacent lines has the same phase angle and amplitude. This indicates the presence of a complementary-color vertical transition. If a complementary-color vertical transition is detected, then the comb filtered luminance and chrominance signals are selectively coupled to the luminance and chrominance processing channels so that the chrominance processing channel receives primarily color information and the color information is excluded from the luminance processing channel. This counteracts the adverse effects of the complementary-color vertical transition.

17 Claims, 7 Drawing Figures

VERTICAL TRANSITION PROCESSOR FOR A COMB FILTER

The present invention relates to a video signal processing system for separating a chrominance and a luminance component from a composite video signal.

Video signal processing systems which use a comb filter to separate the luminance and chrominance components from a composite video signal may not achieve proper separation in the presence of vertical transitions. In such a situation, some brightness information may erroneously appear in the comb filtered chrominance signal (in addition to the low frequency vertical detail brightness information which normally appears there.) In addition, some color-representative information may erroneously appear in the comb filtered luminance signal. The latter condition is manifested by a series of dots at the frequency of the color subcarrier along the vertical transition, and is known as a hanging dot condition. If the erroneous information is not removed from the signals in which it appears and restored to the proper signal, then an objectionable image will be reproduced.

U.S. patent application Ser. No. 724,647 entitled "Hanging Dot Reduction System" filed Apr. 18, 1985 by L. A. Harwood and K. A. Law discloses a system for detecting the presence of a vertical transition and correcting for the presence of objectionable hanging dots caused by the transition. Apparatus according to the above application detects vertical transitions by detecting the cross-correlation between the comb filtered luminance and chrominance signals. If the cross-correlation exceeds a predetermined level, then it is assumed that some color representative information is in the comb filtered luminance signal, and processing is altered to remove this information from the comb filtered luminance signal and restore it to the comb filtered chrominance signal. The system of the above-mentioned application does not detect the presence of complementary-color vertical transitions, however.

In an NTSC composite video signal, color representative information modulates a subcarrier in such a manner that the hue is represented by the phase of the subcarrier, and the saturation is represented by its amplitude. The frequency of the subcarrier is selected such that there is a 180° phase shift from one line to the next. A complementary-color vertical transition occurs when the color on one line causes the subcarrier to be modulated with a given amplitude and a phase of $\theta$, while the color on the preceeding line causes the subcarrier to be modulated with the same amplitude but a phase of $\theta + 180°$. This coupled with the normal 180° phase shift from one line to the next, means that in the presence of a complementary-color vertical transition, the subcarrier for the adjacent lines is in-phase.

A comb filter uses the normal 180° phase shift from line-to-line to separate luminance and chrominance from the composite video signal. Composite video signals separated by one line period are added to generate a luminance signal and subtracted to generate a chrominance signal. The color information is assumed to be canceled from the summed (lumninance) signal because of the 180° phase shift of the subcarrier from one line to the next.

In the case of a complementary-color vertical transition, however, it has been determined that all of the color representative information appears in the summed comb filtered luminance signal output and the subtracted comb filtered chrominance signal output is zero, because the signals of the two lines are in-phase and of the same amplitude. If the comb filtered luminance signal, which contains the color representative information, is processed by the luminance processing channel in the normal manner, then the objectionable hanging dots will be displayed. It is desirable that complementary-color vertical transitions be detected and processing changed to eliminate objectionable effects of such a transition in a video signal processor having a comb filter.

In apparatus according to the principles of the present invention, a detecting means detects if the modulated color subcarrier has a given phase and amplitude on a given line and has the same phase and amplitude on the preceding line. This could indicate the presence of a complementary-color vertical transition. The comb filtered chrominance and luminance signals are coupled to respective luminance and chrominance processing channels. The frequency content of the luminance component is altered in the presence of a complementary-color vertical transition so that the color representative information is excluded from the luminance processing channel. This prevents the occurrence of a display exhibiting a hanging dots condition.

In accordance with another aspect of the present invention, it has been determined that a complementarycolor vertical transition is characterized by two conditions. First, there is a high correlation between the comb filtered luminance signal from the current line, and the comb filtered chrominance signal from the preceeding line. Second, the signal in the frequency band potentially occupied by modulated color representative signals in the comb filtered luminance signal from the preceeding line has a relatively low level.

Apparatus according to this aspect of the present invention detects the presence of a complementary-color vertical transition by detecting the cross-correlation between the comb filtered luminance signal from a given line and the comb filtered chrominance signal from the preceeding line and a relatively low-level comb filtered luminance signal from the preceeding line. If these conditions are detected, then the color representative information, which is in the comb filtered luminance signal, is restored to the signal supplied to the chrominacne processing channel, and the color representative information is eliminated from the signal supplied to the luminance processing channel.

In accordance with the principles of a further aspect of the present invention, an adaptive threshold detector for multibit digital signals includes a plurality of OR gates. Each OR gate has inputs coupled to a different number of most significant bits of the input multibit digital signal. The outputs of the plurality of OR gates are coupled to respective inputs of a multiplexer. The multiplexer couples one of its inputs to an output under control of a controller which can select the optimum threshold level for the conditions.

Figure 1:
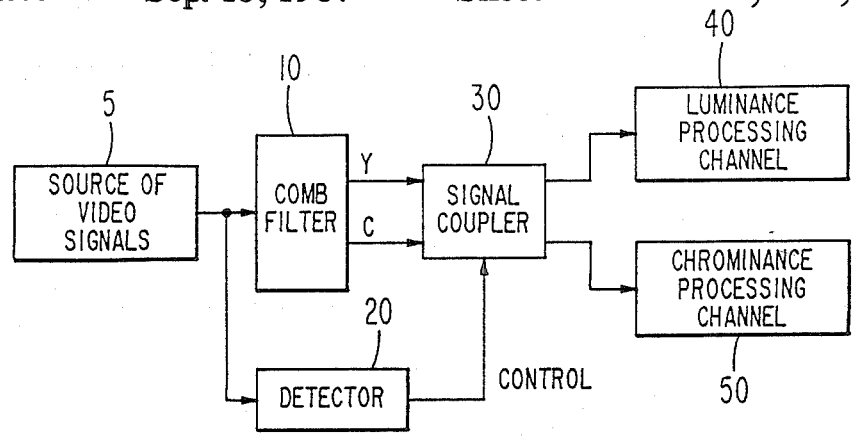
FIG. 1 is a block diagram of a complementary-color vertical transition signal processor in accordance with the principles of the present invention.

In FIG. 1, a source 5 supplies a video signal to a comb filter 10, and a complementary-color vertical transition detector 20. Comb filter 10 generates a luminance signal Y and a chrominance signal C. The comb filtered luminance Y and chrominance C signals are coupled to a signal coupling circuit 30. The complementary-color vertical transition detector 20 generates a control signal which is coupled to the signal coupling circuit 30. The signal coupling circuit 30 has a first output, coupled to the luminance processing channel 40, and a second output, coupled to the chrominance processing channel 50.

As described above, in the presence of a complementary-color vertical transition, the comb filtered luminance signal Y from comb filter 10 contains modulated color representative information. The complementary-color vertical transition detector 20 detects if the modulated subcarrier, carrying color representative information, has a given phase and a given amplitude on a given line; and if it has the same phase and amplitude on the preceeding line. This is indicative of a complementary-color vertical transition, and a control signal is generated. The signal coupling circuit 30, in response to this control signal, restores the portion of the comb filtered luminance signal Y assumed to contain the modulated color representative information to the signal supplied to the chrominance processing channel 50. The signal coupling circuit also deletes this information from the signal supplied to the luminance processing channel 40.

Figure 2:
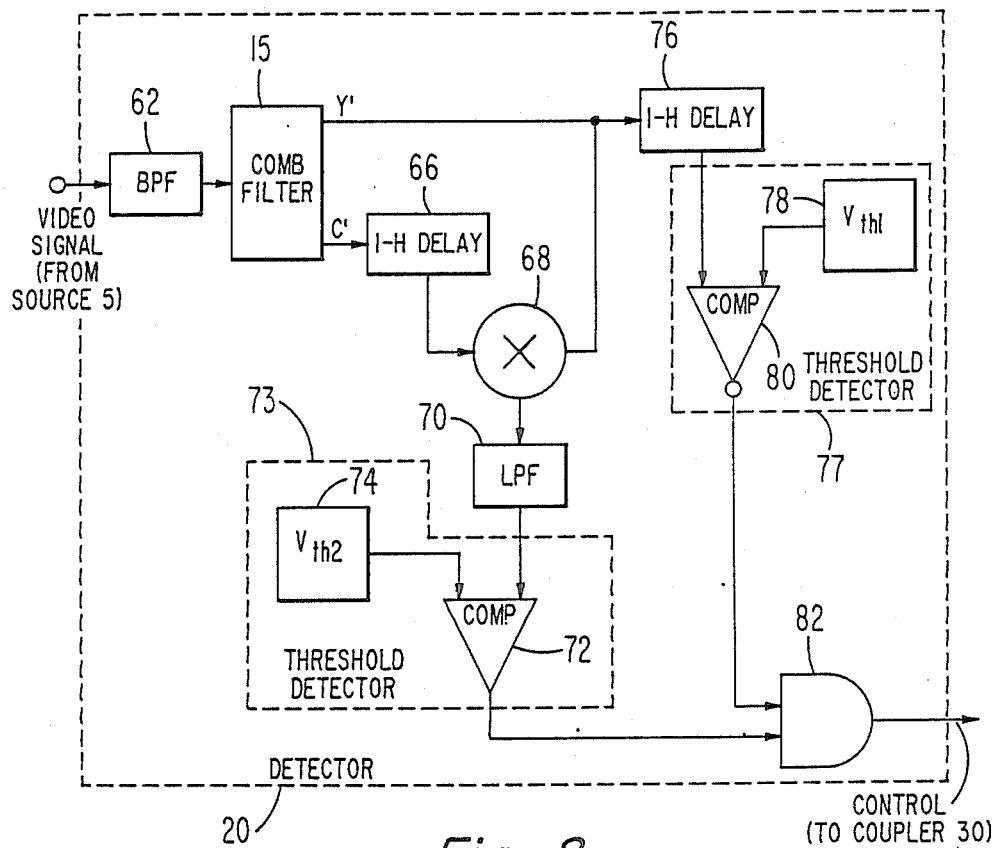
FIG. 2 is a block diagram of a complementary-color vertical transition detector which may be used in the processor illustrated in FIG. 1.

FIG. 2 illustrates a complementary-color vertical transition detector 20 which may be used for the corresponding element in FIG. 1. Bandpass filter 62 receives a video signal from the source 5 (of FIG. 1). The output of bandpass filter 62 is coupled to a comb filter 15. Bandpass filter 62 passes the portion of the video signal which normally contains modulated color representative information. Comb filter 15 produces bandpassed comb filtered luminance Y' and chrominance C' signals. (Alternatively, comb filter 10 of FIG. 1 could supply comb filtered luminance Y and chrominance C signals to respective bandpass filters similar to bandpass filter 62. The outputs of these two bandpass filters would correspond to the output of comb filter 15 of FIG. 2.) The bandpassed comb filtered luminance output Y' of comb filter 15 is coupled to one input of a multiplier 68, and the bandpassed comb filtered chrominance output of C' is coupled to delay circuit 66, which delays the input signal by one horizontal line period. The ouput of delay circuit 66 is coupled to another input of multiplier 68. The output of multiplier 68 is coupled to low pass filter 70. The output of low pass filter 70 is coupled to one input of comparator 72. A source of threshold voltage 74 is coupled to the other input of comparator 72.

Comparator 72 and threshold voltage source 74 form a threshold detector 73.

The bandpassed comb filtered luminance output Y' of comb filter 15 is also coupled to a delay circuit 76 which delays the input signal by one horizontal line. The output of delay circuit 76 is coupled to one input of a comparator 80. A source of threshold voltage source 78 is coupled to the other input of comparator 80. Comparator 80 and threshold voltage source 78 form a threshold detector 77.

The output of threshold detector 73 is coupled to one input of an AND gate 82, and the output of threshold detector 77 is coupled to the other input of AND gate 82. The output of AND gate 82 is the control signal supplied to signal coupler 30 (of FIG. 1).

In an NTSC video signal processing system, for example, the passband of bandpass filter 62 runs from approximately 3 MHz to 4 MHz. The bandpassed comb filtered chrominance signal C' contains only that portion of the comb filtered chrominance signal normally containing modulated color representative information, and excludes the majority of vertical detail luminance information. The bandpassed comb filtered luminance signal Y' contains those frequencies which contain modulated color representative information at a complementary-color vertical transition.

The output of delay circuit 66 is the bandpassed comb filtered chrominance signal delayed by one horizontal line. In the presence of a complementary-color vertical transition, the signals at the Y' output of comb filter 15, and the output of delay circuit 66 will be in-phase and have the same amplitude, as described above. If each of these signals is assumed to be a sine wave then the output of multiplier 68 will be:

$$\sin(\omega t)\sin(\omega t) = \sin^2(\omega t) = \tfrac{1}{2} + \tfrac{1}{2}\cos(2\omega t) \qquad (1)$$

Equation (1) shows that a DC term results which will pass through low pass filter 70 and trigger threshold detector 73.

The output of threshold detector 73 is a "1" when the input to comparator 72 from low pass filter 70 exceeds the threshold level supplied by threshold voltage source 74, and is a "0" otherwise. A "1" at the output of threshold detector 73 indicates that the cross-correlation between the bandpassed comb filtered luminance signal representing the present line and the bandpassed comb filtered chrominance signal representing the preceeding line has exceeded the predetermined level.

The output of threshold detector 77 is a "1" when the input to comparator 80 from delay circuit 76 is below the threshold level supplied by threshold voltage source 78, and is a "0" otherwise. (This is the logical inverse of the normal operation of a threshold detector, and is signified by the small circle at the output of comparator 80, indicating a logic inversion.) A "1" at the output of threshold detector 77 indicates that the level of the bandpassed comb filterd luminance signal representing the preceeding line is below a predetermined level.

The output of AND gate 82 is a "1" only if the signals supplied to both of its inputs are "1". This occurs when both the level of the cross-correlation between the bandpassed comb filtered luminance signal representing the present line and the bandpassed comb filtered chrominance signal representing the preceeding line exceeds a first predetermined level and the level of the bandpassed comb filterd luminance signal representing the preceeding line is below a second predetermined level.

Thus, the output of AND gate 82 is a "1" in the presence of a complementary-color vertical transition.

Figure 3:
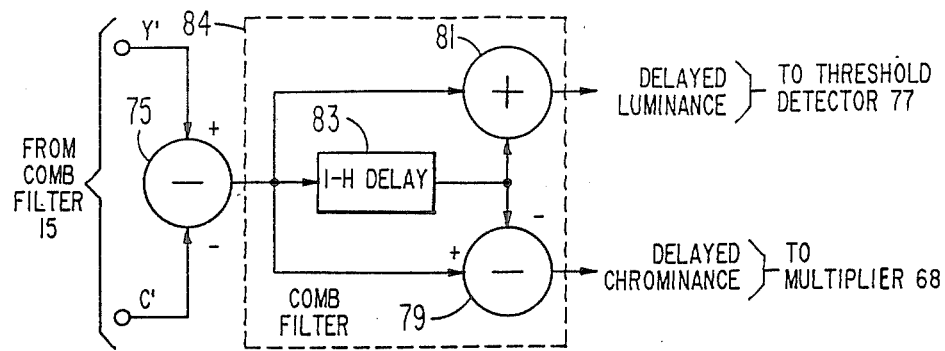
FIG. 3 is a block diagram of a delay circuit which may be used in the detector illustrated in FIG. 2.

FIG. 3 illustrates a delay circuit which may be used in the cross-correlator of FIG. 2 to supply the delayed bandpassed comb filtered chrominance and luminance signals to multiplier 68 (which in FIG. 2 is supplied by delay circuit 66) and to threshold detector 77 (which in FIG. 2 is supplied by delay circuit 76) respectively. The luminance and chrominance outputs of comb filter 15 (of FIG. 2) supply signals to first and second inputs of a first subtractor 75. The output of subtractor 75 is coupled to the input of a delay circuit 83, a first input of a second subtractor 79, and a first input of an adder 81. The output of delay circuit 83 is coupled to a second input of subtractor 79, and a second input of adder 81. Delay circuit 83, subtractor 79 and adder 81 form a comb filter 84. The delayed bandpassed comb filtered chrominance signal is produced at the output of subtractor 79. This signal is supplied to multiplier 68 (of FIG. 2). The delayed bandpassed comb filtered luminance signal is produced at the output of adder 81. This signal is supplied to threshold detector 77 (of FIG. 2).

The outputs of a 1-H delay comb filter are as follows:

$$Y = \tfrac{1}{2}(L_2 + L_1) \quad (2)$$

$$C = \tfrac{1}{2}(L_2 - L_1) \quad (3)$$

where Y is the comb filtered luminance signal, C is the comb filtered chrominance signal, and $L_1$ and $L_2$ are the composite video signals for the first and second lines respective. From equations (2) and (3), it is seen that:

$$L_1 = Y - C \quad (4)$$

$$L_2 = Y + C \quad (5)$$

The output of the first subtractor 75 includes the combined luminance and chrominance components for the frequency band normally containing the modulated color representative information for the first line input to the comb filter. This signal is then delayed by delay circuit 83 for one line period. To recover the luminance and chrominance components, the delayed signal is comb filtered by the combination of delay circuit 83, second subtractor 79, and adder 81 forming comb filter 84. The output of subtractor 79 is the delayed comb filtered chrominance signal representing the preceeding line. This component is supplied to multiplier 68 of FIG. 2. The output of adder 81 is the delayed comb filtered luminance signal representing the preceeding line. This component is supplied to threshold detector 77 of FIG. 2.

Figure 4:
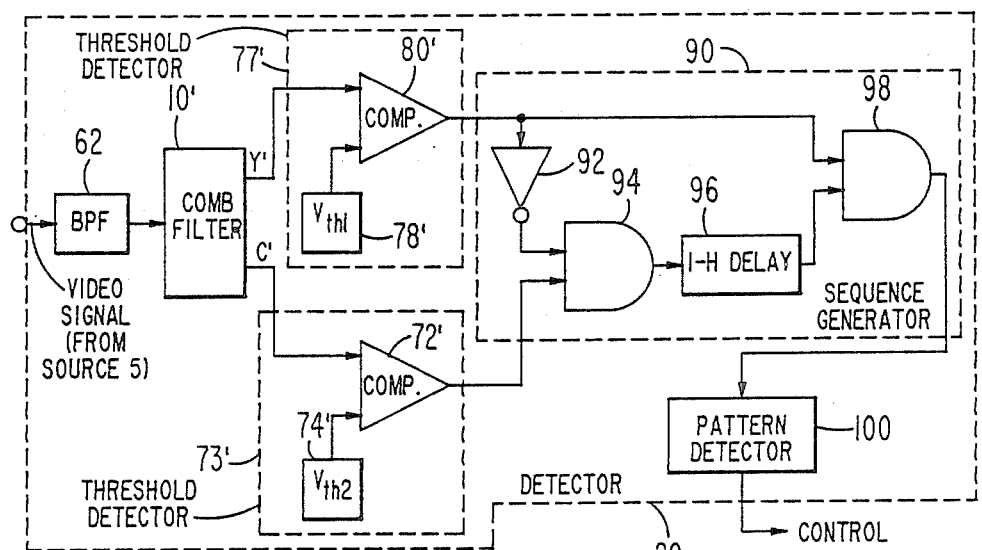
FIG. 4 is a diagram partially in block diagram form and partially in logic diagram form of an alternative detector which may be used in the processor illustrated in FIG. 1.

FIG. 4 illustrates an alternative detector 20 which may be used for the corresponding element in FIG. 1. Elements similar to those in the detector of FIG. 2 are numbered the same. Bandpass filter 62 supplies a bandpassed video signal to comb filter 10'. Comb filter 10' produces a bandpassed comb filtered luminance signal Y' and a bandpassed comb filtered chrominance signal C'. The bandpassed comb filtered luminance signal Y' is coupled to a first input terminal of a comparator 80'. A second input terminal of the comparator 80' is coupled to a source of threshold voltage 78'. Comparator 80' and threshold voltage source 78' in combination form a first threshold detector 77'.

The bandpassed comb filtered chrominance signal C' is coupled to a first input terminal of a comparator 72'. A second input terminal of comparator 72' is coupled to a source of threshold voltage 74'. Comparator 72' and threshold voltage source 74' in combination form a second threshold detector 73'. Both threshold detectors 77' and 73' produce a "1" when the input signal exceeds the threshold level set by the threshold voltage source (78' or 74',) and a "0" otherwise.

The output of threshold detector 77' is coupled to the input of an inverter 92, and a first input of AND gate 98. The output of inverter 92 is coupled to a first input of AND gate 94. The output of threshold detector 73' is coupled to the other input of AND gate 94. The output of AND gate 94 is coupled to a delay circuit 96. The output of delay circuit 96 is coupled to a second input of AND gate 98. Inverter 92, AND gate 94, delay circuit 96 and AND gate 98 in combination form a sequence generator 90. The output of AND gate 98 is a sequence of bilevel signals. In the presence of cross-correlation between the bandpassed comb filtered luminance signal from the present line and the bandpassed comb filtered chrominance signal from the preceeding line, and a relatively low level bandpassed comb filterd luminance signal from the preceeding line, AND gate 98 generates a sequence with a predetermined pattern, (discussed below).

The output of sequence generator 90 is coupled to a pattern detector 100. Pattern detector 100 will detect the predetermined pattern indicating the presence of a complementary-color vertical transition and produce a control signal indicating the presence of this pattern. This control signal is used to control the signal coupling circuit 30 (of FIG. 1).

If the bandpassed comb filtered luminance signal supplied to threshold detector 77' has a relatively low level, then the output of threshold detector 77' will be "0". The output of inverter 92 will be a "1" in such a case and will allow the signal from threshold detector 73' to pass into delay circuit 96. If, on the other hand, the bandpassed comb filtered luminance signal supplied to threshold detector 77' has a relatively high level, then the output of threshold detector 77' will be "1". The output of inverter 92 will be a "0" in such a case, and "0"s will be supplied by AND gate 94 to delay circuit 96. Only "0" will be supplied to AND gate 98 in this condition, and the predetermined pattern will not be produced, regardless of the output of the threshold detector 73'.

In the illustrated embodiment, both signals supplied to AND gate 98 (when enabled by the output of inverter 92 being "1"), are at the color subcarrier frequency and in-phase; both signals simultaneously are "1" for one-half the period and "0" for the other half. The output of AND gate 98, thus, is a sequence of alternating "1"s and "0"s, each having a period of one-half the period of the color subcarrier. This is the predetermined pattern indicating the presence of a complementary-color vertical transition.

Examples of pattern detectors which may be used in the cross-correlator illustrated in FIG. 4 are found in U.S. patent application Ser. No. 760,911 entitled "Digital Pulse Width Detector" filed July 31, 1985 by L. A. Harwood and R. A. Wargo; U.S. patent application Ser. No. 724,644 entitled "Duration Sensitive Signal Stretcher" filed Apr. 18, 1985 by R. A. Wargo; and U.S. patent application Ser. No. 724,646 entitled "Duration-sensitive Digital Signal Gate" filed Apr. 18, 1985 by L. A. Harwood and K. A. Law. Each of these applications detects a known pattern of a given duration, and generates an output signal indicating the presence of this pattern. Other implementations of pattern detectors are known to those skilled in the art.

Figure 5:
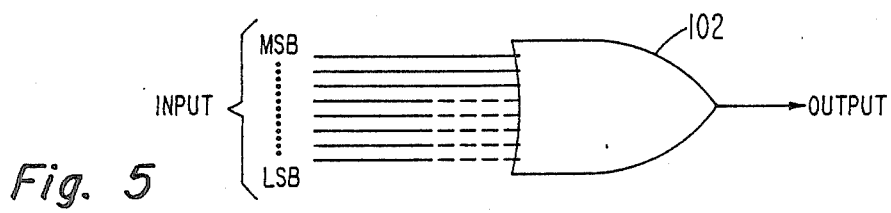
FIG. 5 is a logic diagram of a threshold detector which may be used in a multibit digital implementation of the detectors illustrated in FIGS. 2 and 4.

FIG. 5 illustrates a fixed threshold detector which may be used in a multibit digital implementation of a threshold detector used in FIGS. 2 or 4. In such implementations OR gate 102 of FIG. 5 replaces the comparators 72, 80, 72' and 80' and threshold voltage sources 74, 78', 74' and 78' of threshold detectors 73, 73', 77 and 77' of FIGS. 2 and 4. The input digital signal is contained on a plurality of signal lines. In the illustrated embodiment, there are eight digital signal lines. Of the digital signal lines, only a plurality of most significant bits are coupled to respective inputs of OR gate 102. In the illustrated embodiment, the three most significant bits are coupled to OR gate 102. The output of OR gate 102 is the signal indicating whether the input signal exceeds the threshold level.

If the digital signal is represented in eight-bit straight binary form, these bit positions represent 32, 64 and 128. Thus, only binary values greater than 32 out of a maximum of 255 will cause the output of the OR gate to become a "1". Different numbers of most significant bits may be coupled to the OR gate 102, resulting in different thresholds, as illustrated in phantom on FIG. 5.

Figure 6:
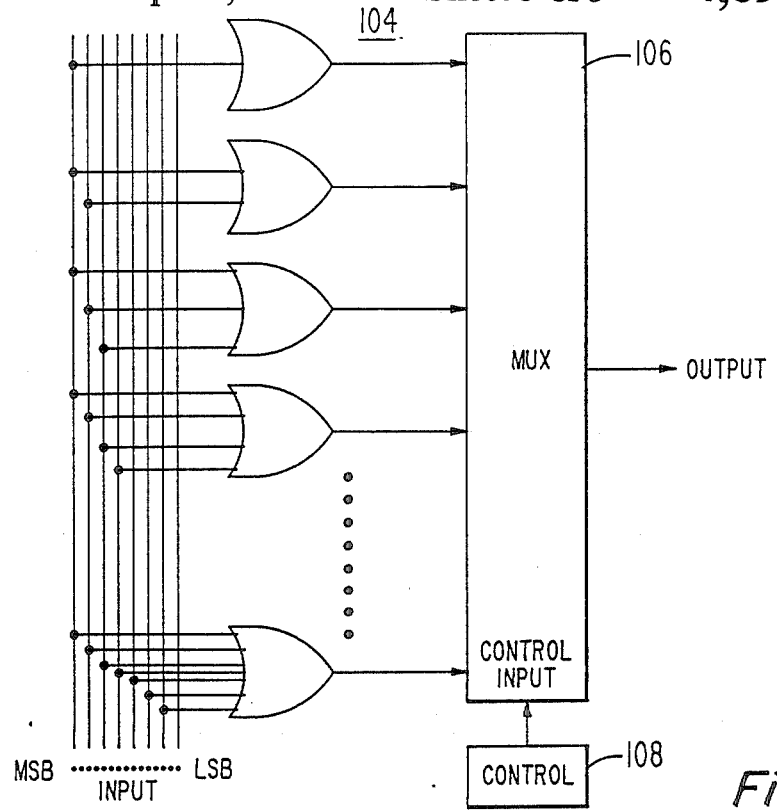
FIG. 6 is a diagram partially in block diagram form and partially in logic diagram form of an adaptive threshold detector which may be used in a multibit digital implementation of the detectors illustrated in FIGS. 2 and 4.

FIG. 6 illustrates an adaptive threshold detector which may be used for a multibit digital implementation of the threshold detectors illustrated in FIGS. 2 and 4. The adaptive threshold detector illustrated in FIG. 6 replaces the comparators 72, 80, 72' and 80' and threshold voltage sources 74, 78, 74' and 78' of threshold detectors 73, 77, 73' and 77' of FIGS. 2 and 4. A plurality of OR gates 104 each has a different number of most significant bits of the input digital signal coupled to their inputs. For example, the top OR gate has only the most significant bit coupled to its input. (In this case, the OR gate could be replaced by a straight connection from input to output.) This OR gate responds only to digital signals greater than 128 out of a maximum of 256. The bottom OR gate has the seven most significant bits coupled to its input, and responds to digital signals greater than 2 out of 256.

The outputs of the plurality of OR gates 104 are coupled to respective signal inputs of multiplexer (MUX) 106. The signal output of multiplexer 106 is coupled to one of the signal inputs in response to a selection signal supplied to the control input of multiplexer 106. The selection signal is supplied to multiplexer 106 from a control circuit 108. The signal output of multiplexer 106 is the signal indicating whether the input signal exceeds the currently selected threshold level.

The multiplexer 106 acts to connect a single OR gate of the plurality of OR gates 104 into the signal path. This allows the threshold to change, because each OR gate of the plurality 104 responds to a different predetermined threshold.

As one illustrative example, the control signal may relate to the signal-to-noise ratio of the composite video signal. The signal-to-noise ratio may, for example, be calculated by analyzing the noise in the composite signal during vertical blanking, when no video signal is present. If the signal-to-noise ratio is high (i.e. the noise is low), then the threshold may be set lower without danger of false triggering by noise pulses. If the signal-to-noise ratio is low (i.e. the noise is high), then the threshold must be set high to avoid false triggering by noise pulses.

As another illustrative example, the control signal may relate to the level of the chrominance signal relative to the luminance signal. In a video signal processing system, an automatic chrominance control (ACC) signal, derived from the amplitude of the color burst component, represents this relative level. If the chrominance signal is relatively high, then the threshold may be set higher. If the chrominance signal is relatively low, then the threshold may be set lower. The threshold, thus, tracks the relative strength of the chrominance component.

In addition, these two control schemes could be used in combination. If the signal-to-noise ratio is high, indicating a non-noisy signal, then the ACC based threshold control scheme is used. If the signal-to-noise ratio is low, indicating a noisy signal, then the threshold is set high regardless of the relative level of the chrominance component.

These are some examples of possible sources of control signals. Other schemes are possible and are evident to one skilled in the art.

Figure 7:
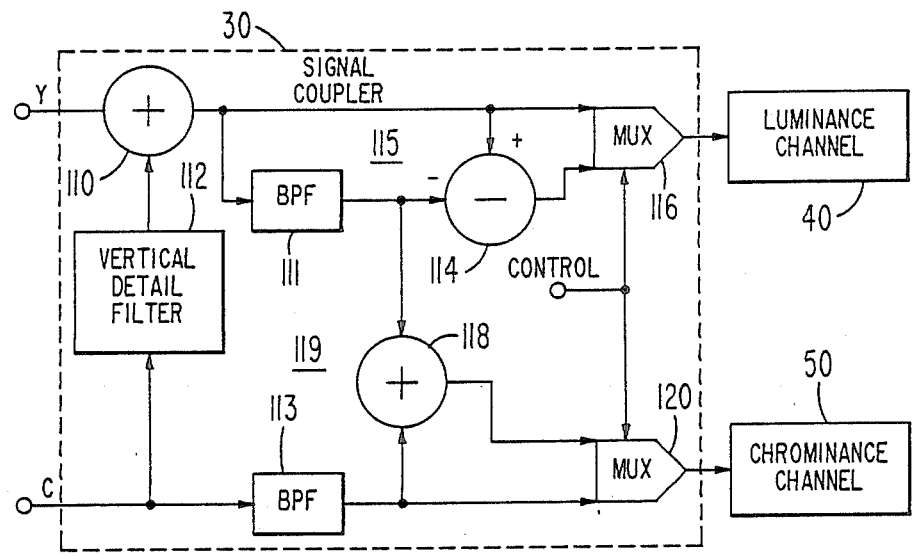
FIG. 7 is a block diagram of a signal coupler which may be used in the processor illustrated in FIG. 1.

FIG. 7 illustrates a signal coupling means 30 which may be used in the processor illustrated in FIG. 1. Elements similar to those in FIG. 1 are numbered the same. The comb filtered luminance signal is supplied to one input of an adder 110. The comb filtered chrominance signal is coupled to a vertical detail filter 112. The output of vertical detail filter 112 is coupled to the other input of adder 110. Vertical detail filter 112 passes that portion of the comb filtered chrominance signal which normally contains only low frequency luminance information, called vertical detail information.

The output of adder 110 is coupled to bandpass filter 111. Bandpass filter 111 passes that portion of the luminance signal which, in the presence of a complementary-color vertical transition, contains modulated color representative information. The output of bandpass filter 111 is coupled to one input of a subtractor 114. The output of adder 110 is coupled to the other input of subtractor 114. Subtractor 114 subtracts the output of bandpass filter 111 from the output of adder 110. The output of subtractor 114, in the presence of a complementary-color vertical transition, contains primarily luminance information and is substantially free of modulated color representative information.

The output of subtractor 114 is coupled to a first signal input of multiplexer (MUX) 116. The output of adder 110 is coupled to a second signal input of multiplexer 116. A control input of multiplexer 116 receives a control signal, for example, from the detectors 20 illustrated in FIGS. 2 and 4 and described above. A signal output of multiplexer 116 is coupled to luminance processing channel 40.

The comb filtered chrominance signal C is also coupled to a bandpass filter 113. Bandpass filter 113 passes that portion of the comb filtered chrominance signal which normally contains only modulated color representative information.

The output of bandpass filter 113 is coupled to a first input of an adder 118, and the output of bandpass filter 111 is coupled to a second input of adder 118. In the presence of a complementary-color vertical transition, the output of adder 118 contains the modulated color representative information in the comb filtered chrominance signal, as passed by bandpass filter 113; plus the modulated color representative information from the comb filtered luminance signal as passed by bandpass filter 111. The output of adder 118 is coupled to a first signal input of multiplexer (MUX) 120, and the output of bandpass filter 113 is coupled to a second signal input of multiplexer 120. A control input of multiplexer 120 also receives the control signal. The signal output of multiplexer 120 is coupled to the chrominance processing channel.

As discussed above, the bandpassed comb filtered chrominance and luminance signals required by the circuits illustrated in FIGS. 2 and 4 may be supplied from the outputs of bandpass filters 113 and 111 respectively.

When the control signal indicates the presence of a complementary-color vertical transition, the multiplexers 116 and 120 couple the output of subtractor 114 to the luminance processing channel 40 and the output of adder 118 to the chrominance processing channel 50 respectively. Otherwise, multiplexers 116 and 120 couple the output of adder 110 to the luminance processing channel 40 and the output of bandpass filter 113 to the chrominance processing channel 50, respectively. In this manner, any modulated color representative information in the comb filtered luminance signal in the presence of a complementary-color vertical transition is excluded from the signal supplied to the luminance processing channel 40, and is restored to the signal supplied to the chrominance processing channel 50.

It is to be understood that, unless specifically stated to the contrary, the circuits described above and illustrated in the drawings may be constructed in either continuous or sampled data form, and in the sampled data form, the circuits may be constructed in either analog or digital form.

What is claimed is:

1. In a video signal processing system, including a source of composite video signals including a subcarrier on which color-representative information is modulated in such a manner that the phase of the subcarrier represents the hue and the amplitude of the subcarrier represents the saturation, a comb filter responsive to said source for producing comb filtered luminance and chrominance signals, a luminance processing channel, and a chrominance processing channel; a vertical transition processor, comprising:

means, coupled to said source, for detecting when the subcarrier on adjacent lines has the same phase and the same amplitude, indicating a complementary-color vertical transition; and means, responsive to said detecting means, for coupling said comb filtered luminance signal to said luminance processing channel including means for altering the frequency content of said comb filtered luminance signal in the presence of a complementary-color vertical transition.

2. The system of claim 1 wherein said detecting means is coupled to said source by said comb filter and is responsive to said comb filtered luminance an chrominance signals.

3. In a video signal processing system, including a source of composite video signals including a subcarrier on which color-representative information is modulated in such a manner that the phase of the subcarrier represents the hue and the amplitude of the subcarrier represents the saturation, a comb filter responsive to said source for producing comb filtered luminance and chrominance signals, a luminance processing channel, and a chrominance processing channel; a vertical transition processor, comprising:

means, coupled to said source by said comb filter and responsive to said comb filtered luminance and chrominance signals, for detecting when the subcarrier on adjacent lines has the same phase and the same amplitude, indicating a complementary-color vertical transition and comprising a cross-correlator, including: means for delaying at least said comb filtered chrominance signal by one horizontal line period, a multiplier responsive to said delayed comb filtered chrominance signal and said comb filtered luminance signal, a low pass filter responsive to said multiplier, a threshold detector, having an input coupled to said low pass filter, for generating an output signal having a first state when the signal at said input exceeds a given threshold level, and a second state otherwise; and means, responsive to said detecting means, for coupling said comb filtered luminance signal to said luminance processing channel including means for altering the frequency content of said comb filtered luminance signal in the presence of a complementary-color vertical transition.

4. The processor of claim 3, wherein:

said delaying means also delays said comb filtered luminance signal by one horizontal line period; and said detecting means further comprises:

a second threshold detector, having an input coupled to receive said delayed comb filtered luminance signal, for generating an output signal having said first state when the signal at said input is less than a second given threshold level, and said second state otherwise; and a logic circuit, coupled to said first-mentioned and said second threshold detector, for generating a control signal in response to said output signals from said detectors.

5. The processor of claim 3 wherein said delaying means comprises:

a first subtractor for subtracting said comb filtered chrominance signal from said comb filtered luminance signal; and a comb filter for producing at respective outputs delayed comb filtered luminance and chrominance signals.

6. The processor of claim 3, wherein said threshold detector comprises:

an adaptive threshold detector including a control input wherein said given threshold level varies in response to the signal at said control input.

7. The processor of claim 6, wherein said adaptive threshold detector is responsive to the amplitude of the burst component of said video signal.

8. The processor of claim 7, wherein said adaptive threshold detector is further responsive to the signal-to-noise ratio of said video signal.

9. The processor of claim 6 wherein said adaptive threshold detector is responsive to the signal-to-noise ratio of said video signal.

10. The processor of claim 6 wherein said processor operates on a multibit digital signal, and said adaptive threshold detector comprises:

a plurality of OR gates having respective first input terminals responsive to a mutually different bit of said multibit digital signal, each OR gate having further input terminals responsive to a plurality of bits each more significant than that to which its first input terminal is responsive; and a multiplexer having a plurality of signal inputs coupled to respective OR gates, a control input and a signal output, for coupling one of said signal inputs to said signal output responsive to the signal at said control input.

11. In a video signal processing system, including a source of composite video signals including a subcarrier on which color-representative information is modulated in such a manner that the phase of the subcarrier represents the hue and the amplitude of the subcarrier represents the saturation, a comb filter responsive to said source for producing comb filtered luminance and chrominance signals, a luminance processing channel, and a chrominance processing channel; a vertical transition processor, comprising:

means, coupled to said source by said comb filter and responsive to said comb filtered luminance and chrominance signals, for detecting when the subcarrier on adjacent lines has the same phase and the same amplitude indicating a complementary-color vertical transition comprising a cross-correlator including: first and second threshold detectors having respective inputs coupled to said comb filtered luminance and chrominance signal sources, and generating respective output signals having a first rate when the signal at said input exceeds a given respective threshold level, and having a second state otherwise, means, responsive to said first and second threshold detectors, for generating a sequence of signals having a known pattern in the presence of a complementary-color vertical transition, and a pattern detector, responsive to said sequence generating means, for producing a signal indicating the presence of said known pattern in said sequence of signals; and means responsive to said detecting means, for coupling said comb filterd luminance signal to said luminance processing channel including means for altering the frequency content of said comb filtered luminance signal in the presence of a complementary-color vertical transition.

12. The processor of claim 11, wherein said sequence generator comprises:

an inverter coupled to said first threshold detector;

a first AND gate having a first input coupled to said inverter, a second input coupled to said second threshold detector, and an output;

a delay circuit, coupled to the output of said first AND gate, for delaying signals by one horizontal line period; and a second AND gate having a first input coupled to said first threshold detector, a second input coupled to said delay circuit, and an output at which said known pattern is produced in the presence of a complementary-color vertical transition.

13. In a video signal processing system, including a source of composite video signals including a subcarrier on which color-representative information is modulated in such a manner that the phase of the subcarrier represents the hue, and the amplitude of the subcarrier represents the saturation, a comb filter responsive to said source for producing comb filtered luminance and chrominance signals, a luminance processing channel, and chrominance processing channel; a vertical transition processor, comprising:

means, coupled to said source for detecting when the subcarrier on adjacent lines has the same phase and the same amplitude indicating a complementary-color vertical transition; and means, responsive to said detecting means, for coupling said comb filtered luminance signal to said luminance processing channel including means for altering the frequency content of said comb filtered luminance signal in the presence of a complementary-color vertical transition comprising: first means, responsive to said comb filtered luminance signal, for altering the frequency content, and producing a signal containing information exclusive of modulated color representative information in the presence of a complementary-color vertical transition, second means, responsive to said comb filtered luminance and chrominance signals, for producing a signal containing modulated color representative information from said comb filtered luminance signal in the presence of a complementary-color vertical transition and information from said comb filtered chrominance signal, and means responsive to said detecting means for selectively coupling said luminance and chrominance processing channels to said first and second signal producing means respectively in the presence of said cross-correlation, and to said comb filtered luminance and chrominance signal sources otherwise.

14. The processor of claim 13, wherein said first means comprises:

a bandpass filter having an input coupled to said source of comb filter luminance signal and an output, for passing the band of frequencies which normally contains modulated color representative information in the presence of a complementary-color vertical transition; and a subtractor having a first input coupled to said source of comb filtered luminance signal, a second input coupled to said bandpass filter, and an output, for subtracting the signal at said second input from the signal at said first input.

15. The processor of claim 13, wherein said second means comprises:

a firt bandpass filter having an input coupled to said source of comb filtered luminance signal and an output, for passing the band of frequencies which normally contains modulated color representative information in the presence of a complementary-color vertical transition a second bandpass filter having an input coupled to said source of comb filtered chrominance signal and an output, for passing the band of frequencies which normally contains modulated color representative information; and an adder having first and second inputs coupled to said first and second bandpass filters respectively.

16. The processor of claim 13, wherein said coupling means comprises:

a first multiplexer having a first signal input coupled to said first signal producing means, a second signal input coupled to said source of comb filtered luminance signals, a control input coupled to said detecting means, and a signal output, for coupling said signal output to said first input in the presence of said cross-correlation, and said second input otherwise; and a second multiplexer having a first signal input coupled to said second signal producing means, a second signal input coupled to said source of comb filtered chrominance signals, a control input coupled to said detecting means, and a signal output, for coupling said signal output to said first input in the presence of said cross-correlation, and said second input otherwise.

17. In a video signal processing system, an adaptive threshold detector for a multibit digital signal, comprising:
 a plurality of OR gates having respective first input terminals responsive to a mutually different bit of said multibit digital signal, each OR gate having further input terminals responsive to a plurality of bits each more significant than that to which its first input terminal is responsive; and
 a multiplexer having a plurality of signal inputs coupled to respective OR gates, a control input and a signal output, for coupling one of said signal inputs to said signal output responsive to the signal at said control input.

* * * * *

UNITED STATES PATENT AND TRADEMARK OFFICE
CERTIFICATE OF CORRECTION

PATENT NO. : 4,694,331

DATED : September 15, 1987

INVENTOR(S) : Kirk A. Law et al.

It is certified that error appears in the above-identified patent and that said Letters Patent is hereby corrected as shown below:

Column 1, line 62 should read "(luminance)" instead of "(lumninance)

Column 2, lines 28 and 29 should read "complementary-color" instead of "complementarycolor"

Column 2, line 47 should read "chrominance" instead of "chrominacne"

Column 9, line 40 should read "saturation" instead of "staturation"

Column 11, line 27 should read "state" instead of "rate"

Column 12, line 42 should read "first" instead of "firt"

Signed and Sealed this

Twenty-fifth Day of October, 1988

*Attest:*

DONALD J. QUIGG

*Attesting Officer*  *Commissioner of Patents and Trademarks*